Figure 1:
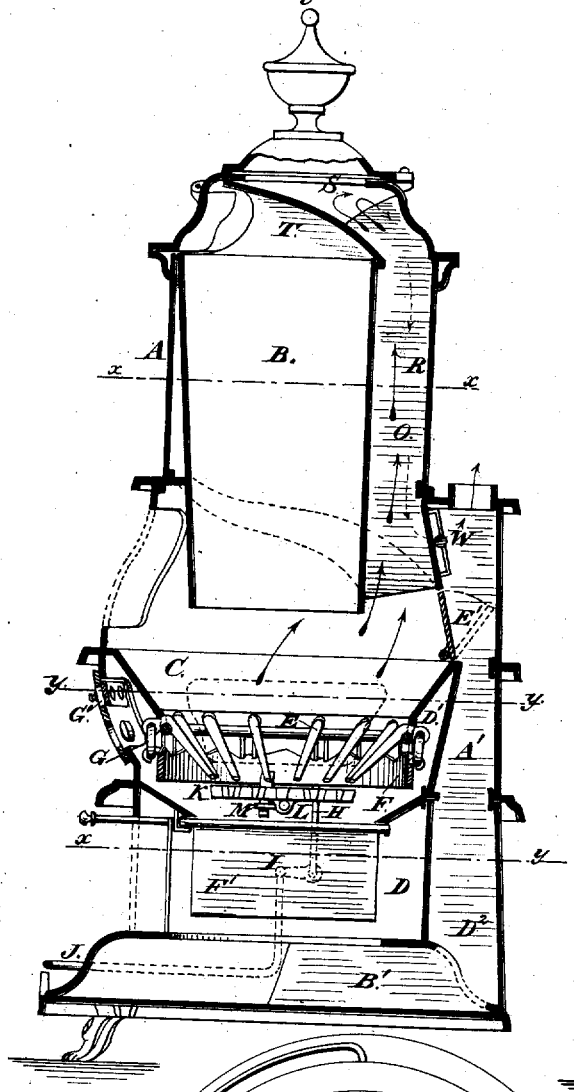

D. E. PARIS.
Parlor-Stove.

No. 8,336. Reissued July 16, 1878.

Section on line x.x.

Attest:
J. C. Brecht
J. A. Rutherford

Daniel E. Paris,
Inventor.
By James L. Norris,
Attorney.

N. PETERS, PHOTO-LITHOGRAPHER, WASHINGTON, D. C.

D. E. PARIS.
Parlor-Stove.

No. 8,336. Reissued July 16, 1878.

*Section on line y y.*

*Section on line x.y.*

*Daniel E. Paris,*
*Inventor.*

*Attest:*
*T. C. Brecht*
*J. A. Rutherford*

*By James L. Norris,*
*Attorny.*

N. PETERS, PHOTO-LITHOGRAPHER, WASHINGTON, D. C.

UNITED STATES PATENT OFFICE.

DANIEL E. PARIS, OF OMAHA, NEBRASKA.

IMPROVEMENT IN PARLOR-STOVES.

Specification forming part of Letters Patent No. 194,107, dated August 14, 1877; Reissue No. 8,336, dated July 16, 1878; application filed April 29, 1878.

*To all whom it may concern:*

Be it known that I, DANIEL E. PARIS, of Omaha, in the county of Douglas and State of Nebraska, have invented certain new and useful Improvements in Parlor-Stoves, of which the following is a specification:

This invention relates to certain improvements in stoves, its object being to facilitate the raking of the fire, the dumping of the grate, and the removal of clinkers from the burning coals; to provide for rapidly and effectually heating a pot or kettle of water or other article on top of the stove; and to enable the lower part of the stove to be employed for baking purposes.

This invention consists, first, in a series of lifting bars or fingers, arranged radially in a circle along the bottom part of the fire-box, inclosed within the body of the stove, and adapted to be simultaneously raised or lowered by means of a lever or crank arranged on the outside of the stove, and connected with said lifting bars or fingers by suitable intermediate mechanism; second, in a fender or foot-rest for stoves, extending across the front of the stove, in combination with the grate or fire-pot bars and suitable connecting-links, whereby said foot-rest or fender is adapted to operate as a shaker for the grate or fire-pot bars; third, in the combination, with the upward turning or lifting bars or fingers, a fire-pot having a central dumping bottom or grate, surrounded by said fingers or bars, and suitable devices for operating said fingers or bars; fourth, in the combination of a lever or shaker arranged upon the outside of a stove, a series of lifting fingers or bars arranged in a circle below the fire-pot of said stove, and suitable intermediate devices connecting said shaker or lever with all of said fingers or bars, and adapted to produce a vertical vibration thereof; fifth, in a movable ring or frame located below the fire-box of a stove, a series of loosely-pivoted lifting-fingers arranged below, substantially as shown, suitable pivoted links connecting said ring or frame with said lifting-fingers, and a suitable lever or shaker connected to said ring or frame, whereby said lifting-fingers may be simultaneously operated.

Having stated the principles and object of my invention, I proceed to more fully illustrate and specify its application to a magazine-stove of a round form, as usually made by the trade, and as shown in the drawings.

Figure 2:
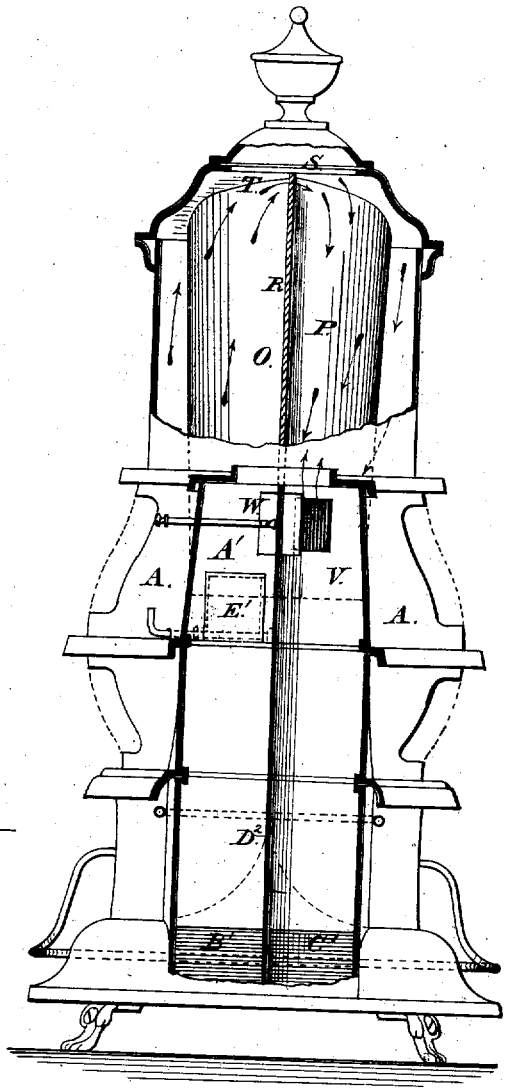
Figure 3:
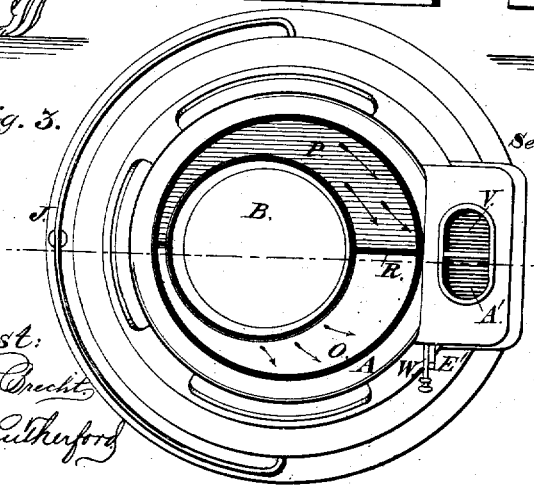
Figure 4:
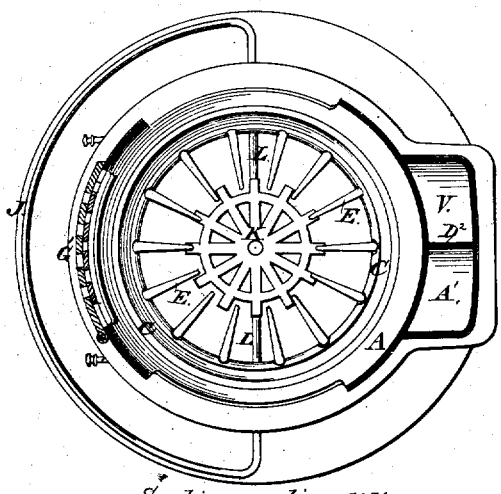
Figure 5:
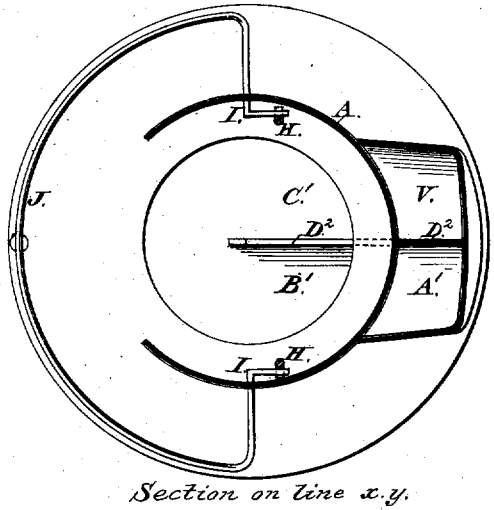
Figure 6:
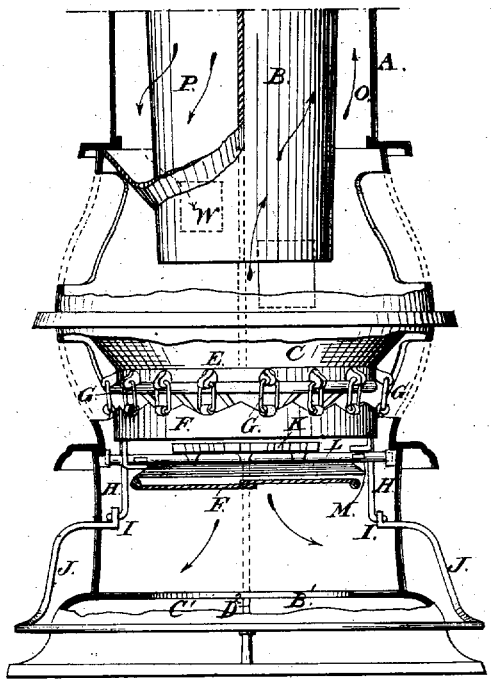
Figure 7:
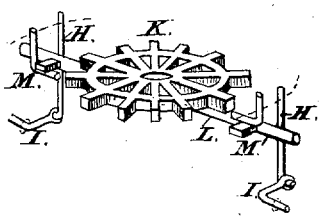

Figure 1 represents a vertical sectional view of my improved stove. Fig. 2 represents a view, showing partly a rear elevation and partly a section of the stove. Fig. 3 represents a top view of the stove with the upper part removed. Fig. 4 represents a horizontal section on the line *y y* of Fig. 1. Fig. 5 represents a horizontal section on the line *x y* of Fig. 1; Fig. 6, a front elevation, with a portion of the shell broken away; and Fig. 7, a detached perspective view of the grate, showing the means of operating the same.

The letter A represents the outer shell of the stove; B, the magazine; C, an annular section, to which the finger or levers forming the fire-pot are pivoted. Said section is constructed of metal, and may be lined with fire-brick, if desired. The upper edge of said section is secured to the stove-shell at its largest diameter, the lower edge depending within said shell, leaving an annular draft-space between said section and stove-shell. D represents the ash-pit, constructed as usual. The lower edge of said frustum or section is slotted at convenient distances, and within said slots are located the bent levers or fingers E, each lever being notched underneath, so as to sit over the lower edge of the slot and permit said lever to oscillate freely thereon.

F represents an annular frame, of metal, suspended immediately below the fire-pot by means of a series of links, G, attached to the upper ends of the levers or fingers E. From each side of said annular frame depends a link, H, the lower ends of which respectively are connected to the inner ends of two levers, I, which extend through opposite sides of the ash-box of the stove, the outer ends of said levers being connected to the ends of a curved fender-bar, J, which extends around the front of the stove-base.

K represents the dumping-bottom of the stove-grate, located between the fire-box and the ash-pit, in such position relatively to the fingers or levers E that when the two are in their normal position the lower ends of the fingers will rest between the bars, forming the lining to the fire-pot or a downwardly-projecting part of the fire-pot itself. Said dumping-bottom is secured upon a transverse rock-shaft, L, or is provided with trunnions at each side, journaled in the walls of the ash-pit; and said journals or trunnions, on opposite sides of the dumping-bottom, are provided with horizontal lugs or projections, under one of which sits an L-shaped lug, M, and over the other a similarly-shaped lug, M′, both of which depend from the bottom of the annular frame, and which serve to oscillate the dumping-bottom simultaneously with the movement of the levers or fingers E, as hereinafter more fully explained; or the grate may be entirely detached from the annular frame and operated separately from it, which is preferable for ordinary uses.

An annular space is left between the walls of the magazine and the external shell of the stove, and this space is divided into two flues, O and P, by means of the vertical partition R, one of said flues communicating at its lower end with the upper part of the fire-chamber, and at its upper end with a space, S, formed immediately below the pot or boiler aperture by means of an inclined partition-plate, T, which divides said space from the interior of the magazine. The other flue, P, communicates at its upper end with said space S, and at its lower end with an escape-flue, V, located at the rear of the stove, the opening at said lower end of the flue being provided with a damper, W, for the purpose of controlling the passage of the products of combustion, as more fully hereinafter explained.

At one side of the flue V is formed a similar flue, A′, the two extending downwardly to the base of the stove, and communicating with a space below the ash-pit of the stove, said space being divided into two communicating flues, B′ and C′, by means of a partial partition, $D^2$. The upper end of the flue A′ communicates with the fire-chamber by means of a suitable opening, which is provided with a damper, E′, for opening or closing communication between said flue and fire-chamber.

Directly below the grate are located two swinging doors or dampers, F′, one at each side of the ash-pit, which are capable of being folded up against the lower part of the grate, when desired, so as to cut off communication between the ash-pit and the fire-chamber, in order to allow the ash-pit to be used as an oven, when desired, as more fully hereinafter explained.

In order to provide for a proper draft at all times, whether said dampers are closed or not, the draft-openings and register G′ are located above the ash-pit, said openings communicating with the annular draft-chamber surrounding the grate and lower part of the fire-box.

The opening for filling the magazine is located at one side, on top of the stove, immediately below the upper end of the inclined partition-plate which divides the magazine from the space below the pot or kettle hole, and is provided with a hinged cover, by which it may be closed; and the stove is provided with suitable openings around the fire-chamber, which are inclosed by mica plates, as usual, and similar openings and micas may be arranged around the annular draft-passage, if desired.

The operation of my improved stove is as follows: The fire is kindled and the magazine is filled with coal, as usual. Upon opening the damper E′ and closing the damper W, the products of combustion pass directly into the escape-flue and out of the chimney, giving a direct draft to enable the fire to be readily started. Upon closing the damper E′ and opening the damper W, the products of combustion will be caused to pass up into the flue O and space S and downward into the flue V.

When it is required to loosen and discharge the ashes from the grate, the foot-rail or fender is partially elevated, which correspondingly elevates the fingers, and also tips the dumping-grate, if it is attached. By moving the fender up and down quickly the fingers are rapidly moved up and down, thus rattling and sifting the ashes from the coals completely, while the coal itself is held up in the fire-pot, and only allowed to fall back upon the grate when the fingers resume their normal position in the sides of the fire-pot.

When the fingers assume a horizontal position they practically take the place of a stove-grate by holding the coals upward, thus forming, as it were, a lifting-grate, by means of which the coals are lifted upward from the grate proper; and as the lifting-grate again resumes its normal position the lower coals in the fire-pot fall downward upon the grate, leaving the whole mass honey-combed, as it were, and lying loosely in contact with each other, so that the air entering through the draft-openings may easily pass up through, causing more perfect combustion.

By this practically double grate the coals can be lifted upward off of the lower grate, and may be held in such position, so that the fire may be rekindled upon the grate, if it should become extinguished, without dumping the coal from the fire-pot, and the lower grate may be raked off, if desired, while the mass of burning coal is held upon the upper grate.

It will be seen that, as thus constructed, the fire or coals can be raked and cleaned of ashes without opening any doors whatever, and all inconvenience from escaping dust and ashes will be avoided. Moreover, no slag or clinkers will be formed in said stove, for by the action of the fingers all such accumulations that naturally fall to the grate are lifted up and lodged in the center of the burning fuel after they have been freed from ashes, and entirely consumed.

What I claim, and desire to secure by Letters Patent, is—

1. A series of lifting bars or fingers arranged radially in a circle along the bottom part of the fire-box, inclosed within the body of the stove, and adapted to be simultaneously raised or lowered by means of a lever or crank arranged on the outside of the stove and connected with said lifting bars or fingers by suitable intermediate mechanism.

2. A fender or foot-rest extending across the front of the stove, in combination with the grate or fire-pot bars and suitable connecting-links, whereby said foot-rest or fender is adapted to operate as a shaker or lever for the grate or fire-pot bars, substantially as and for the purpose set forth.

3. The combination, with the upward turning or lifting bars or fingers, of a fire-pot having a central dumping bottom or grate, surrounded by said fingers or bars, and suitable devices for operating said fingers or bars, substantially as described, and for the purpose set forth.

4. The combination of a lever or shaker arranged upon the outside of a stove, a series of lifting fingers or bars arranged in a circle below the fire-pot of said stove, and suitable intermediate devices connecting said shaker or lever with all of said fingers or bars, and adapted to produce a vertical vibration thereof, substantially as described, and for the purpose set forth.

5. A movable ring or frame located below the fire-box of a stove, a series of loosely-pivoted lifting-fingers, arranged substantially as shown, suitable pivoted links connecting said ring or frame with said lifting-fingers, and a suitable lever or shaker connected to said ring or frame, whereby said lifting-fingers may be simultaneously operated, substantially as described, and for the purpose set forth.

In testimony that I claim the foregoing I have hereunto set my hand in the presence of two witnesses.

DANL. E. PARIS.

Witnesses:
C. M. PARIS,
GEORGE M. POWERS.